(12) United States Patent
Beneker et al.

(10) Patent No.: US 7,810,881 B2
(45) Date of Patent: Oct. 12, 2010

(54) VEHICLE SEAT FRAME WITH A HINGE MOUNTING, MORE SPECIFICALLY WITH A SEAT BACK HINGE MOUNTING

(75) Inventors: Wilfried Beneker, Leichlingen (DE); Nils Magnus, Remscheid (DE)

(73) Assignee: C. Rob. Hammerstein GmbH & Co. KG (DE)

( * ) Notice: Subject to any disclaimer, the term of this patent is extended or adjusted under 35 U.S.C. 154(b) by 0 days.

(21) Appl. No.: 12/274,516

(22) Filed: Nov. 20, 2008

(65) Prior Publication Data

US 2009/0127916 A1 May 21, 2009

(30) Foreign Application Priority Data

Nov. 20, 2007 (DE) .................. 10 2007 055 600

(51) Int. Cl.
*B60N 2/42* (2006.01)
*B60R 21/00* (2006.01)
*A47C 7/02* (2006.01)

(52) U.S. Cl. ............... 297/216.1; 297/216.13; 297/216.15; 297/216.16; 297/452.2

(58) Field of Classification Search ............... 297/216.1, 297/216.13, 216.14, 216.15, 216.16, 452.2
See application file for complete search history.

(56) References Cited

U.S. PATENT DOCUMENTS

| | | | | |
|---|---|---|---|---|
| 5,690,386 | A * | 11/1997 | Chabanne | 297/452.2 X |
| 5,711,577 | A * | 1/1998 | Whalen | 297/452.2 X |
| 5,722,731 | A * | 3/1998 | Chang | 297/452.2 X |
| 5,795,024 | A * | 8/1998 | Collins et al. | 297/361.1 |
| 5,895,090 | A * | 4/1999 | Farquhar et al. | 297/216.1 |
| 6,045,186 | A * | 4/2000 | Butt et al. | 297/216.1 X |
| 6,109,690 | A * | 8/2000 | Wu et al. | 297/216.13 |
| 6,142,563 | A * | 11/2000 | Townsend et al. | 297/216.1 |
| 6,164,720 | A * | 12/2000 | Haglund | 297/216.1 |
| RE37,026 | E * | 1/2001 | Whalen | 297/452.2 X |
| 6,170,898 | B1 * | 1/2001 | Cunningham et al. | 296/65.16 |
| 6,582,023 | B2 * | 6/2003 | Houston et al. | 297/216.1 X |
| 6,659,548 | B2 * | 12/2003 | Becker et al. | 297/216.1 |
| 6,685,272 | B1 * | 2/2004 | Bonk et al. | 297/463.1 |
| 6,736,458 | B2 * | 5/2004 | Chabanne et al. | 297/216.15 X |
| 6,739,658 | B2 * | 5/2004 | Pedronno et al. | 297/216.1 |
| 6,786,543 | B2 * | 9/2004 | Andersson et al. | 297/216.13 |
| 6,902,234 | B2 * | 6/2005 | Becker et al. | 297/216.1 |
| 7,195,311 | B2 * | 3/2007 | Kuliha et al. | 297/216.1 |
| 7,243,992 | B2 * | 7/2007 | Canteleux et al. | 297/216.1 |
| 7,360,832 | B2 * | 4/2008 | Yokota et al. | 297/216.16 |
| 7,364,237 | B2 * | 4/2008 | Grable et al. | 297/378.1 |
| 2002/0047296 | A1 * | 4/2002 | Houston et al. | 297/216.1 |

(Continued)

*Primary Examiner*—Rodney B White
(74) *Attorney, Agent, or Firm*—Cantor Colburn LLP

(57) ABSTRACT

A frame of a motor vehicle seat for a motor vehicle including a hinge mounting having a hinge arm, and further including a structure part, said structure part being connected to the hinge arm in a connection region, the connection region being rigid when subjected to a load below a threshold value that occurs at accelerations in a normal driving condition of the motor vehicle and the connection region being compliant when subjected to bending loads at values occurring at accelerations of the motor vehicle occurring in an event of an accident, whereby the connection region includes a tongue that projects from one of the hinge arm and the structure part, and further includes a holding device that is provided on the one of the hinge arm and the structure part on which the holding device is not provided.

8 Claims, 3 Drawing Sheets

U.S. PATENT DOCUMENTS

2003/0102701 A1* 6/2003 Pedronno et al. .......... 297/216.1
2003/0160483 A1* 8/2003 Becker et al. .......... 297/216.16
2005/0231010 A1* 10/2005 Nagayama ............... 297/216.1
2006/0152048 A1* 7/2006 Kamei et al. .............. 297/216.1
2007/0158983 A1* 7/2007 Yokota et al. ............. 297/216.1
2008/0100104 A1* 5/2008 Axelsson et al. ......... 297/216.1

* cited by examiner

VEHICLE SEAT FRAME WITH A HINGE MOUNTING, MORE SPECIFICALLY WITH A SEAT BACK HINGE MOUNTING

TECHNICAL FIELD OF THE INVENTION

The invention relates to a frame of a motor vehicle seat with a hinge mounting, in particular with a seat back hinge mounting, said hinge mounting comprising a hinge arm and with a structure part, said structure part being connected to the hinge arm in a connection region, said connection region being rigid at a bending load below a value occurring when the motor vehicle accelerates in the normal driving condition and being compliant at a bending load having values occurring in case the motor vehicle accelerates in the event of an accident.

BRIEF DESCRIPTION OF RELATED ART

Such a frame for a motor vehicle seat is known from DE 199 44 635 A1. In the connection region there are provided recesses or deformations that locally weaken the material and cause it to yield. This solution has proved efficient in principle. In order to be capable of better protecting a passenger in the event of an accident of the motor vehicle, it is necessary to somehow consume the greatest possible part of the acceleration forces. This is achieved, inter alia, by the intentional deformation.

BRIEF SUMMARY OF THE INVENTION

The invention further develops this idea and more specifically devises it so as to be easier to calculate and to design.

In view thereof, the invention further develops the frame of the type mentioned herein above in such a manner that crash forces can be absorbed more on purpose, a construction being aimed at that allows for the most precise possible computation of the deformation.

In view of the frame of the type mentioned herein above, the solution to this object is that the connection region comprises a tongue that projects from the hinge arm or from the structure part and a holding device that is provided on the other part, meaning on the structure part or on the hinge arm.

Accordingly, the invention proposes a tongue that engages into a holding device. This cooperation between tongue and holding device can be calculated very accurately. The discrete parts can be designed so as to be deformed by bending above an acceleration due to an accident, and to be hardly influenced below this acceleration value. The advantage thereof is that at acceleration values that do not yet enable an airbag, no deformations occur. As a result, deformations by bending cannot occur. Above the acceleration values as they occur in the event of a crash, enabling for example the air bag, increasing deformation occurs. Considerable energy is consumed. This is wanted since it leads to a certain but still controlled compliance of the structure.

In an advantageous development of the invention, the solution as described herein above can be combined to advantage with a layered construction of the structure part. In this case, the tongue cooperates with one layer of the sandwich arrangement of the structure part. It is advantageously retained laterally by one other layer at least.

In a preferred development, the holding device has a hinge connection that is provided between hinge arm and holding device. In this way, a hinge connection is provided for bending. This hinge connection determines the axis about which bending occurs. As a result, the range of movement between the hinge arm and the structure part is limited to a concrete trajectory of movement. This makes computing the deformation easier and makes it possible to make clear statements about the behaviour under load.

In another development of the invention, the connection region comprises a connection with a long hole. On the one part, for example the hinge arm, a bolt is fixed, on the other part, for example on the structure part, there is provided a long hole. Through this long hole connection, the angular range in which bending can occur is limited. The long hole is preferably centered on the axis of a hinge of the motor vehicle seat, e.g., of the rear upper rocker joint.

Preferably, the three provisions mentioned are combined: the hinge connection defines a hinge connection axis about which bending can occur in the event of an accident. The long hole connection limits the angle of the range of movement. The movement itself opposes the connection region which is compliant while consuming energy but only above the threshold at which a crash sensor is enabled.

For cooperation between the tongue and the holding device, several possibilities are provided. The holding device can be a projection that engages a recess of the tongue. The holding device can be formed by lateral surfaces that abut small sides of the tongue and normally retain it. In any case, it is the connection of the tongue or of part of the tongue that is concretely given and can be computed.

BRIEF DESCRIPTION OF THE DRAWINGS

Other features and advantages of the invention will become more apparent upon reviewing the appended claims and the following non restrictive description of embodiments of the invention, given by way of example only with reference to the drawing. In said drawing:

DETAILED DESCRIPTION OF THE INVENTION

Figure 1:
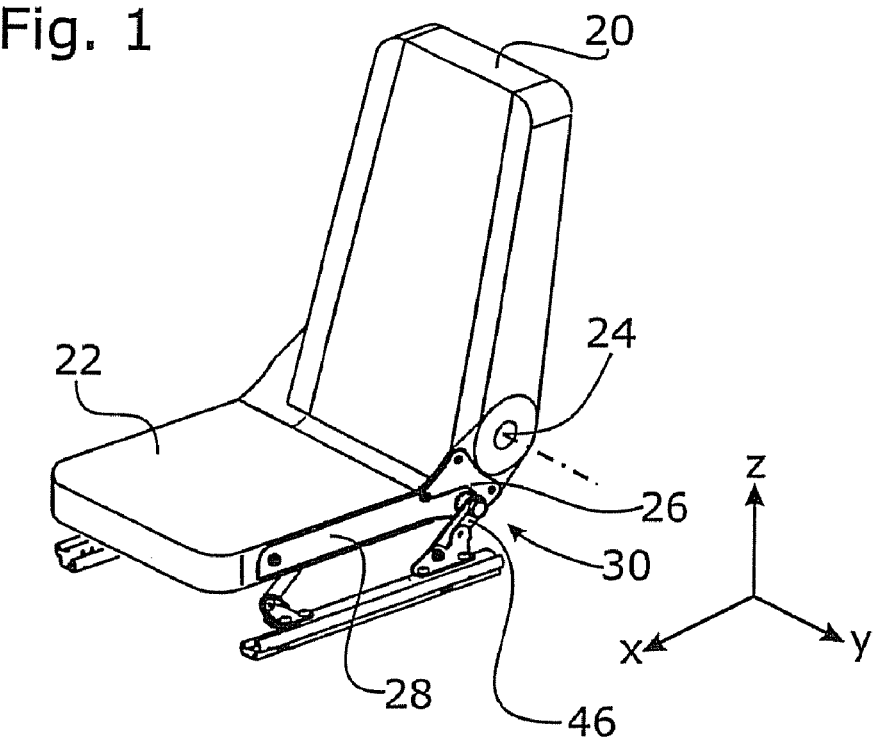
FIG. 1: is a perspective illustration of a frame of a motor vehicle seat.
Figure 2:
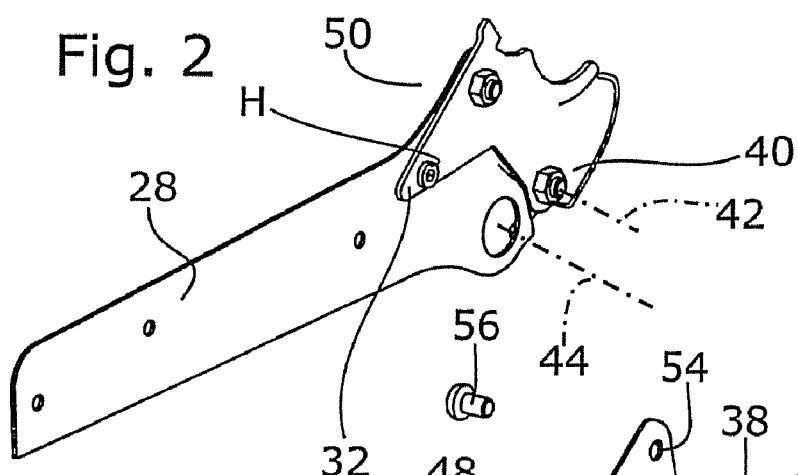
FIG. 2: is a perspective illustration of the left seat frame part, of the hinge arm and of the connection region.
Figure 3:
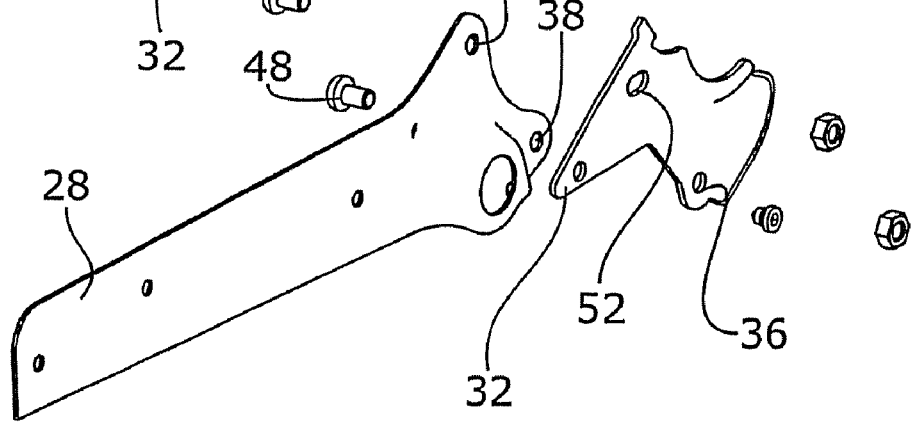
FIG. 3: shows the arrangement like in FIG. 2 in a perspective illustration, but now in the form of an assembly drawing.

For cooperation between a tongue 32 and a holding device H, several possibilities are provided. The holding device H can be a projection that engages a recess of the tongue 32 (FIGS. 1-3). The holding device H can be formed by lateral surfaces that abut small sides of the tongue 32 and normally retain it (FIGS. 4-7). In any case, it is the connection of the tongue 32 or of part of the tongue 32 that is concretely given and can be computed.

The first exemplary embodiment is discussed at first; the other exemplary embodiments will be discussed insofar as they differ from the first exemplary embodiment so that the differences will be substantially discussed then.

FIG. 1 schematically shows a motor vehicle seat, in particular the frame of a motor vehicle seat. Between a seat back 20 and a seat carrier 22, there is formed a hinge mounting 24.

It is implemented according to prior art. This hinge mounting 24 has a hinge arm 26 that is directed toward the seat carrier 22 in the implementation shown. However, it may just as well be directed toward the frame of the seat back 20. On this hinge arm 26 there occurs the connection to a structure part 28 that is here configured to be a seat frame side part. In prior art, the hinge arm 26 is solidly connected to the structure part 28. According to the invention, this connection is not rigid; instead, it is only solid up to a certain threshold above which it is compliant, but within given limits.

The hinge arm 26 and the structure part 28 are joined together in a connection region 30. This connection will be discussed in closer detail herein after. A tongue 32, which is part of the hinge arm 26, belongs to said connection region 30. It extends to the structure part 28 which it covers. In the first exemplary embodiment, the tongue 32 is retained by a projection 34. Concretely, the projection 34 is configured to be a bolt element that engages through a hole in the region of the free end of the tongue 32 and extends into an opening 38 of the structure part 28. The configuration of this arrangement with the bolt element 34 substantially determines the behaviour in the event of an accident. This will be discussed later.

Further, a hinge connection 40 is configured between the hinge arm 26 and the structure part 28. It has an axis 42 which is parallel to the axis of the hinge mounting 24 and also to a hinge axis 44 about which the structure part 28 is hinge-linked to a rear rocker 46. This hinge connection 40 is realized by a screw 48 and by an associated nut; it can also be implemented differently, for example in the form of a rivet. What has to be achieved is a hinge connection 40 that is by no means smooth running but that is subjected to high friction.

Further, a long hole connection 50 is provided between the hinge arm 26 and the structure part 28. Concretely, it is formed in the first exemplary embodiment by a long hole 52 that is made in the hinge arm 26 and is centered on the axis 42, by an associated bore 54 in the structure part 28 and by a threaded bolt 56 with associated nut.

The functioning is as follows: In case of accelerations due to an accident, high forces are generated which act onto the seat back 20. The connection region 30 is subjected to load as a result thereof. If the acceleration forces are not high enough, the motor vehicle seat keeps the configuration shown in the Figs. If acceleration forces are applied as they occur in the event of accidents and which enable a crash sensor or an air bag, bending occurs in the connection region 30. The tongue 32 deforms while consuming energy; the unit formed from the hinge arm 26 and the structure part 28 bends about the axis 42 and within the angular range that is prescribed by the long hole connection 50. The tongue 32 is then deformed. It is computed so as not to be destroyed but to instead still have a solid connection with the structure part 28. Accordingly, this connection should not shear off.

Figure 4:
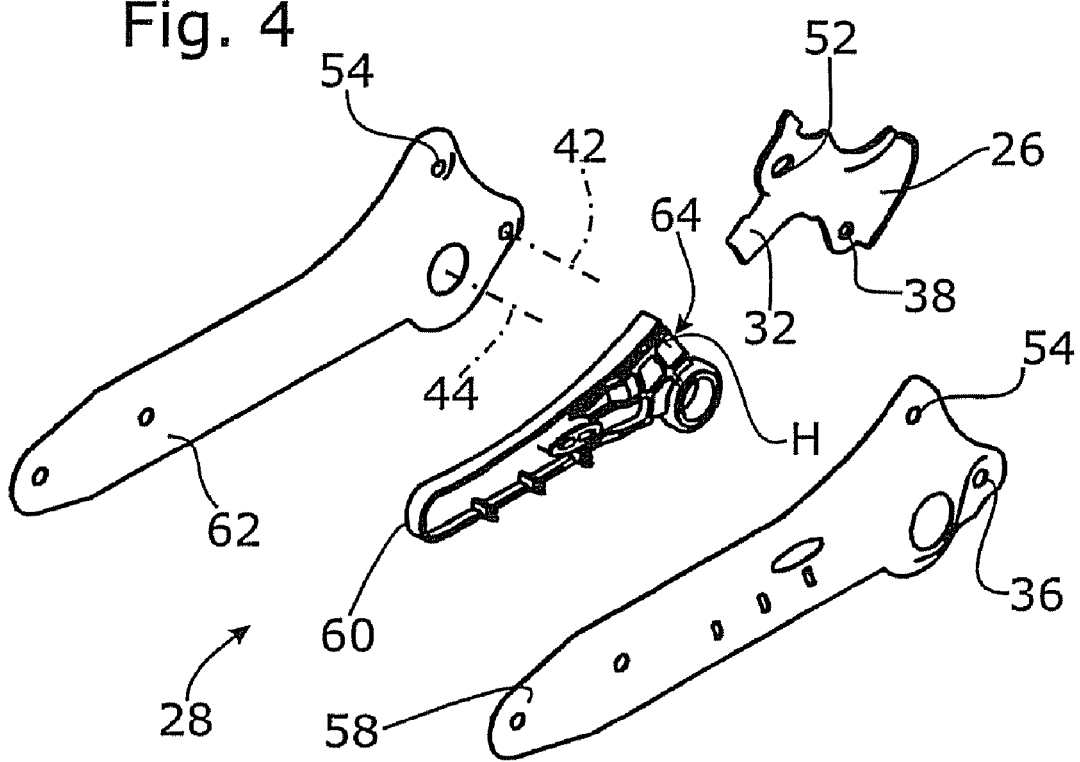
FIG. 4: is a view of a left seat frame side part like in FIG. 3, but now for a second exemplary embodiment.
Figure 5:
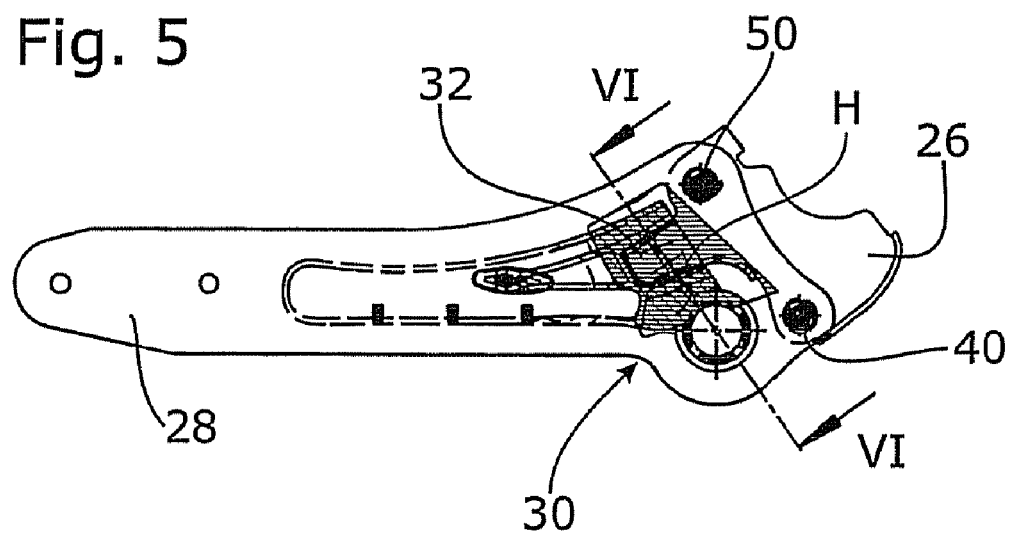
FIG. 5: is a side view of a seat frame side part, of a hinge arm and of a connection region in an implementation similar to FIG. 4 for a third exemplary embodiment.

In the second exemplary embodiment shown in the FIGS. 4 and 5, the structure part 28, which in turn is a seat frame side part, has a layered structure. The layered structure has 2 layers at least, in the exemplary embodiment shown, it has three layers. There is provided at least one first layer, which is a sheet metal part, and there is provided at least one second layer, which is a reinforcement body. This reinforcement body has a material thickness in the y direction which is greater than the material thickness of the sheet metal part.

In the exemplary embodiment shown, the structure part 28 has a first sheet metal part 58, a reinforcement part 60 and a second sheet metal part 62. The sheet metal parts determine the shape of the structure part 28. The sheet metal parts 58, 62 are joined together in the finished condition of the structure part 28, they are more specifically joined together at their borders and form a hollow space in which there is located the reinforcement part 60. The latter has a grid structure; as far as practicable it is of a light-weight construction. It is made from a material that has a considerably lower density than the sheet metal material, in particular sheet steel, of the sheet metal parts 58, 62. The specific weight is at least 50%, preferably at least 100% smaller. The thickness of the reinforcement body in the y direction should be at least 5×, preferably at least 10×, the size of the sheet metal thickness of each sheet metal part 58, 62. Preferably, the reinforcement body 60 has a mesh structure. As a material for the sheet metal parts 58, 62, highly resistant sheet steel is used; the yield strength should be more than 800 N/mm$^2$. A typical material is DP 1000; the wall thickness is in the range of 0.6 to 0.7 mm, in any case below 1 mm. As compared to a frame side part of the art, considerable weight savings are achieved, the weight savings due to the layered structure being at least 25%, often at least 45%, as compared to a part of identical strength exclusively made from sheet steel.

A pocket 64 is formed in the reinforcement part 60. The tongue 32 engages into this pocket 64. Like in the first exemplary embodiment, there is provided a hinge connection 40, the axis 42 is shown for this purpose; there is further provided a long hole connection 50, the long hole 52 being shown for this purpose, said long hole being in turn formed in the hinge arm 26.

Figure 6:
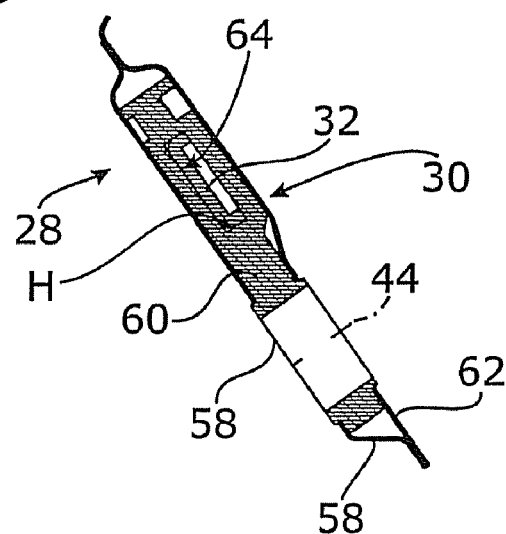
FIG. 6: is a section taken along section line VI-VI in FIG. 5 and FIG. 7: is a perspective illustration in the form of an assembly drawing of a seat frame side part in a fourth exemplary embodiment.

The reinforcement part 60 has a double function. It is part of the sandwich construction which allows for a more light-weight construction of the structure part 28. Additionally, it forms the counterpart to the tongue 32 inside the connection region 30. This appears in particular in FIG. 5. As shown in FIG. 6, the tongue 32 is bent into a U-shape in cross-section. In this way, the reinforcement part 60 is not in immediate proximity to sharp edges of a sheet metal part, which is for example punched. Accordingly, one avoids shearing. As also shown in FIG. 6, there is provided enough air or space for the tongue 32 to be bent.

Figure 7:
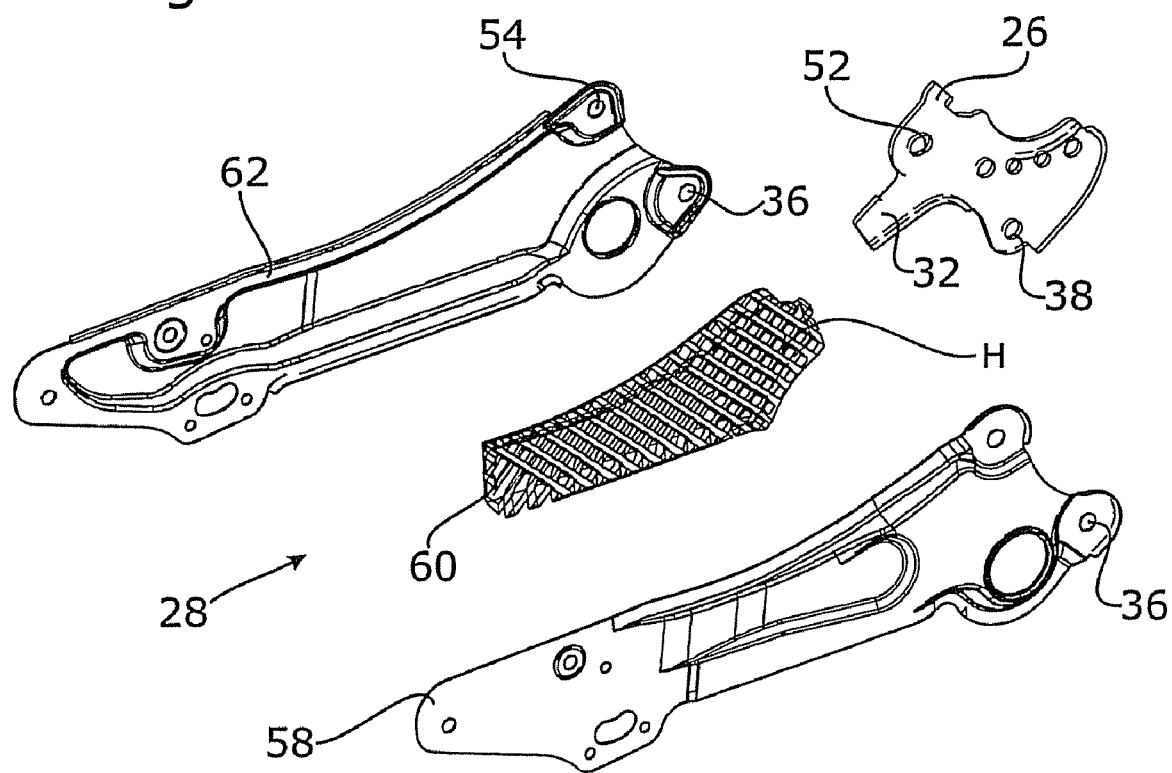

FIG. 7 shows an embodiment similar to the second exemplary embodiment. The reinforcement part 60 is now configured differently, the sheet metal parts 58, 62 also having a certain different shape.

The invention claimed is:

1. A frame of a motor vehicle seat for a motor vehicle, said frame comprising a hinge mounting having a hinge arm, and further comprising a structure part, said structure part being connected to said hinge arm in a connection region, said connection region being rigid when subjected to a load below a threshold value that occurs at accelerations in a normal driving condition of said motor vehicle and said connection region being compliant when subjected to bending loads at values occurring at accelerations of said motor vehicle occurring in an event of an accident, whereby said connection region comprises a tongue and a holding device, said tongue projecting from said hinge arm or said structure part, and said holding device being provided on said hinge arm or said structure part that is non-inclusive of said tongue, wherein a long hole connection is provided between said hinge arm and said structure part, said long hole connection comprising a bolt and an elongated aperture, said bolt being fixed on said hinge arm or said structure part and engaging into said elongated aperture, and said elongated aperture being provided on said hinge arm or said structure part that is non-inclusive of said bolt, said elongated aperture delimiting a maximum bending angle of said connection region in a direction of bending.

2. The frame of a motor vehicle seat as set forth in claim 1, wherein said tongue extends substantially in the x-z plane.

3. The frame of a motor vehicle seat as set forth in claim 1, wherein said connection region comprises a hinge connection that is formed between said hinge arm and said structure part.

4. The frame of a motor vehicle seat as set forth in claim 1, wherein lateral abutment surfaces for said tongue are formed on said structure part.

5. The frame of a motor vehicle seat as set forth in claim 1, wherein said hinge mounting is a back rest hinge mounting.

6. The frame of a motor vehicle seat as set forth in claim 1, wherein lateral abutment surfaces for said tongue are formed on said structure part and that said lateral abutment surfaces are formed by a plastic body.

7. The frame of a motor vehicle seat as set forth in claim 1, wherein said holding device is performed as a projection that engages a recess of said tongue.

8. The frame of a motor vehicle seat as set forth in claim 1, wherein said tongue has small sides and said holding device is formed by lateral surfaces that abut said small sides of the tongue and normally retain it.

* * * * *